(12) United States Patent
Cavalier et al.

(10) Patent No.: US 8,324,301 B2
(45) Date of Patent: Dec. 4, 2012

(54) ACID RESISTANT PARTICLES OF AN ALKALINE EARTH METAL CARBONATE

(75) Inventors: Karine Cavalier, Arles (FR); Gaëlle Rodary, Fos sur mer (FR); Didier Sy, Salin de Giraud (FR); Roberto Rosa, Ranco (IT)

(73) Assignee: SOLVAY (Société Anonyme), Brussels (BE)

( * ) Notice: Subject to any disclaimer, the term of this patent is extended or adjusted under 35 U.S.C. 154(b) by 625 days.

(21) Appl. No.: 11/722,269

(22) PCT Filed: Dec. 20, 2005

(86) PCT No.: PCT/EP2005/056959
§ 371 (c)(1),
(2), (4) Date: Oct. 27, 2009

(87) PCT Pub. No.: WO2006/067144
PCT Pub. Date: Jun. 29, 2006

(65) Prior Publication Data
US 2010/0041809 A1    Feb. 18, 2010

(30) Foreign Application Priority Data

Dec. 22, 2004 (EP) .................................... 04106898
Mar. 7, 2005 (EP) .................................... 05290509

(51) Int. Cl.
*C08K 3/26* (2006.01)

(52) U.S. Cl. ........ 524/425; 524/525; 428/403; 427/214; 423/430

(58) Field of Classification Search .................. 524/424, 524/425; 428/403
See application file for complete search history.

(56) References Cited

U.S. PATENT DOCUMENTS 4,151,136 A    4/1979    Cornell
4,386,169 A *  5/1983    Artur et al. ................... 523/200
(Continued)

FOREIGN PATENT DOCUMENTS

DE         958 830         2/1957
(Continued)

OTHER PUBLICATIONS

Ronthon, R.N. Advances in Polymer Science, vol. 39, p. 67-107, 1999.*

(Continued)

*Primary Examiner* — Doris Lee
(74) *Attorney, Agent, or Firm* — Oblon, Spivak, McClelland, Maier & Neustadt, L.L.P.

(57) ABSTRACT

Alkaline earth metal carbonate exhibiting a resistance to acids expressed as pH of less than 7 measured after suspending 1.0 g of the particles in a mixture made of 20 ml of toluene and 80 ml of an aqueous phase consisting of deionized water, 11.76 g/L of citric acid monohydrate, 2.57 g/L of NaCl and 0.068 mol/L of NaOH, after 35 minutes of stirring at 25° C. and at 1 000 rpm, or expressed as a moisture pick-up lower than or equal to 2 g water/kg of calcium carbonate after one week of storage at 22° C. and 50% relative humidity, or as a Differential Scanning Calorimetry (DSC) spectrum showing at least one peak between 170 and 190° C. when measured at a heating rate of 10° C./min under nitrogen atmosphere from 25 to 250° C. in open cells. Process for the preparation of said particles, compositions containing said particles and the use thereof.

21 Claims, 3 Drawing Sheets

U.S. PATENT DOCUMENTS

| | | | |
|---|---|---|---|
| 4,927,618 A * | 5/1990 | Mathur et al. | 423/432 |
| 5,135,967 A | 8/1992 | Aumann et al. | |
| 5,380,361 A | 1/1995 | Gill | |
| 6,342,100 B1 | 1/2002 | Nover et al. | |
| 7,709,090 B2 * | 5/2010 | Nover et al. | 428/403 |
| 7,847,002 B2 * | 12/2010 | Cavalier et al. | 524/174 |
| 2002/0001569 A1 | 1/2002 | Dromard et al. | |
| 2002/0102404 A1 * | 8/2002 | Nakai et al. | 428/403 |
| 2004/0097616 A1 | 5/2004 | Hoppler et al. | |
| 2004/0109927 A1 * | 6/2004 | Ang et al. | 426/582 |
| 2004/0166047 A1 | 8/2004 | Vogels et al. | |
| 2005/0276897 A1 * | 12/2005 | Nover et al. | 426/594 |
| 2008/0227901 A1 * | 9/2008 | Lefevre et al. | 524/423 |
| 2009/0246285 A1 * | 10/2009 | Stellacci et al. | 424/490 |

FOREIGN PATENT DOCUMENTS

| | | |
|---|---|---|
| EP | 0 005 904 | 12/1979 |
| EP | 0 347 329 | 12/1989 |
| EP | 1 452 489 | 9/2004 |
| JP | 04-031318 | 2/1992 |
| JP | 11-092141 | 4/1999 |
| JP | 2000-345068 | 12/2000 |
| WO | WO 99/28050 | 6/1999 |
| WO | WO 00/01769 | 1/2000 |
| WO | WO 00/61690 | 10/2000 |
| WO | WO 01/32787 | 5/2001 |
| WO | WO 2005/047372 | 5/2005 |
| WO | WO 2006/045768 | 5/2006 |
| WO | WO 2006/051087 | 5/2006 |
| WO | WO 2006/087312 | 8/2006 |
| WO | WO 2006/134080 | 12/2006 |
| WO | WO 2007/009971 | 1/2007 |
| WO | WO 2007/014878 | 2/2007 |
| WO | WO 2007/039625 | 4/2007 |

OTHER PUBLICATIONS

U.S. Appl. No. 11/719,154, filed May 11, 2007, Cavalier, et al.
U.S. Appl. No. 11/666,090, filed Apr. 24, 2007, Ricaud, et al.
U.S. Appl. No. 11/816,326, filed Aug. 15, 2007, Cavalier, et al.
U.S. Appl. No. 11/995,885, filed Jul. 17, 2006, Lefevre, et al.
U.S. Appl. No. 12/089,130, filed Oct. 4, 2006, Lefevre, et al.

* cited by examiner

ACID RESISTANT PARTICLES OF AN ALKALINE EARTH METAL CARBONATE

This application is a 371 of PCT/EP2005/056959, filed Dec. 20, 2005.

The invention relates to particles of an alkaline earth metal carbonate, preferably $CaCO_3$. The particles exhibit an improved resistance to acids and are suitable as additives in polymeric compositions.

The use of finely ground limestone or precipitated calcium carbonate as a filler, for example, for rubber, plastics, paper or paints, is known. Likewise, it is known that the dispersibility of the calcium carbonate particles in or the affinity of the particles towards the substance or the mixture to which the calcium carbonate is to be added as a filler, can be improved or increased by a surface treatment with, for example, a fatty acid or a salt or ester thereof. Said treatment renders the surfaces of the particles of the material more suitable for incorporation in a hydrophobic host. In particular, the hydrophobic coating of carbonate particles with fatty acids or their salts or esters does not only improve the dispersibility but also stabilizes the viscosity of a polymer composition containing such carbonate particles.

In this regard it can be referred e.g. to WO 99/11721 disclosing a method for the controlled surface treatment of calcium carbonate. In one embodiment emulsified saturated and/or unsaturated carboxylic acids, substituted fatty acids, their salts or fatty alcohols are used as coating agents for calcium carbonate particles. The method provides a bimolecular coating, i.e. a double layer, covering 20 to 60% of the crystalline surface of the calcium carbonate particles.

As the properties of carbonate particles coated with a single coating agent are not satisfactory in every respect, in particular in applications requiring complete hydrophobicity of the particles, processes have been developed in the prior art coating carbonate particles with more than one coating agent in one or more coating steps. In this regard it can be referred e.g. to WO 01/32787, U.S. Pat. No. 4,151,136 and US 2002/0102404 A1.

WO 01/32787 discloses a method of treating particles of an alkaline earth metal carbonate material to provide a coating of hydrophobic material on the particles which comprises applying to particles of the carbonate material a hydrophobizing surface treatment agent having at least two components comprising (a) a first component which comprises at least one aliphatic carboxylic acid which has a formula $CH_3(CH_2)_m COOH$ where n is an integer equal to 8 or more and (b) a second component which is an organic compound having a carbonate release temperature substantially higher than the carbonate release temperature of said acid, the second component comprising at least one compound having a formula $CH_3(CH_2)_m COOR$, where m is zero or an integer equal to 1 or more and R is a Group II metal radical or a radical of formula $CH_3(CH_2)_q O-$, where q is zero or an integer equal to 1 or more, wherein at least one of m and q is equal to 8 or more, m being equal to 8 or more when R is a Group II metal radical, wherein the concentration of the first component in the surface treatment agent is such as to give on the carbonate particles an amount of the first component which is at least 0.5X, where X is the minimum concentration of the first component required to give a mono-layer coating of the carbonate particles by the first component, and the coating composition also contains at least 10 percent by weight of the second component.

U.S. Pat. No. 4,151,136 discloses a method for preparing acid readable inorganic mineral fillers wherein a long chain carboxylic acid having 8 to 22 carbon atoms is reacted with the filler particles to form a salt of the acid at the surface of the filler particles. The acid reacted filler is then contacted with a vinyl ester of the long chain carboxylic acid. Thereafter, the vinyl ester monomer is polymerized to provide a cross-linked sheath encapsulating the acid reacted filler. Acid readable inorganic mineral fillers include the metal carbonate salts of Group 2 of the Periodic Table such as the magnesium, barium and calcium carbonates.

US 2002/0102404 A1 discloses a method for producing surface-coated calcium carbonate particles comprising the steps of: coating calcium carbonate particles with (1) a fatty acid mixture comprising (1A) at least one compound selected from the group consisting of saturated fatty acids and salts thereof and (1B) at least one compound selected from the group consisting of unsaturated fatty acids and salts thereof to form a first coating layer, and coating the coated calcium carbonate particles with (2) at least one organic compound selected from the group consisting of phthalic esters, phosphoric esters, adipic esters, sebacic esters, azelaic esters, trimellitic esters and metal alkoxides to form a second coating layer.

However, the properties of the hydrophobically coated carbonate particles of the prior art are still not satisfactory in every respect. For certain applications a polymer composition comprising particles of an alkaline earth metal carbonate should exhibit excellent rheological properties, such as a high yield stress, a high viscosity as well as an excellent dispersibility. These properties should be constant for a certain period of time, preferably for several days or weeks. Furthermore, particularly when the particles are to be used in compositions having pH values of 7 or below, the particles should be resistant to acid, i.e. the outer surface of the carbonate particles should be protected from acidic attack.

Thus, there is a demand for particles of alkaline earth metal carbonates having comparable, preferably better properties than the particles of the prior art. In particular, the particles should be chemically stable, i.e. resistant against chemical degradation. Furthermore, polymer compositions containing the particles should exhibit good rheological and mechanical properties.

This technical problem is solved by the subject matter of the claims. It has been found that particles comprising an alkaline earth metal carbonate can be coated with a specific coating thereby rendering the particles resistant to acids.

Figure 1:
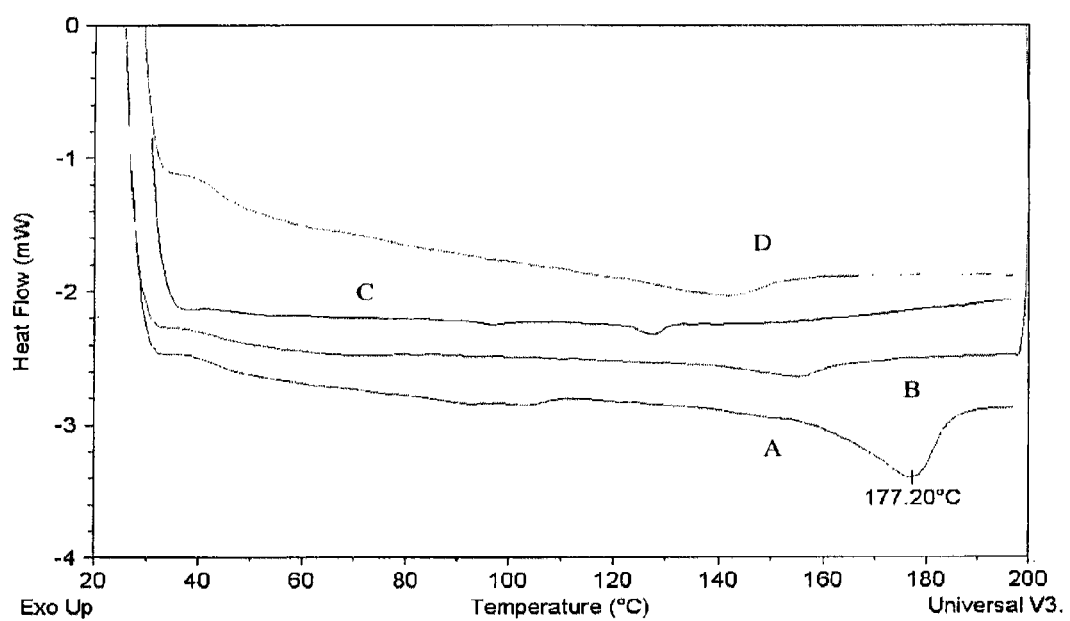
FIG. 1 shows DSC results where curve (a), (b), (c) and (d) refer respectively to particles obtained in example 1, comparative example 3, comparative example 1 and comparative example 2.

The invention relates to the particles as such, polymeric compositions containing said particles, the preparation of the particles and the use thereof.

The particles of the invention are characterized by an excellent resistance to acids. The resistance to acid can be expressed in three different ways.

According to the first way, the acid resistance of the particles according to the invention is defined in that when suspending 1.0 g of the particles in a mixture made of 20 ml of toluene and 80 ml of an aqueous phase consisting of deionized water, 11.76 g/L of citric acid monohydrate, 2.57 g/L of NaCl and 0.068 mol/L of NaOH, after 35 minutes of stirring at 25° C. and at 1 000 rpm, the pH value of the mixture is below 7.00.

The pH value of the mixture before adding the particles is usually around 3.80+/−0.05.

The time required to increase the pH value of the mixture corresponds to the acid resistance of the particles. For example, decomposition of crude $CaCO_3$ particles upon exposure to acids occurs according to the following simplified reaction scheme: $CaCO_3 + H_2O \rightarrow Ca^{2+} + 2OH^- + CO_2$, thereby deliberating hydroxide ions which are responsible for the increase of the pH value.

Preferably, after 35 minutes, more preferably after 37.5 minutes, still more preferably after 40 minutes, yet more preferably after 42.5 minutes, most preferably after 45 minutes, yet most preferably after 47.5 minutes and in particular after 50 minutes the pH value of the mixture is still below 7.00. In a preferred embodiment of the particles according to the invention after 35 minutes, the pH value of the aqueous phase is still below 6.80, more preferably below 6.60, still more preferably below 6.40, most preferably below 6.20, yet most preferably below 6.00 and in particular below 5.95.

According to the second way, the acid resistance of the particles of the invention is expressed as the moisture pick-up of the particles. By moisture pick-up, one intends to denote the difference between the water content of the particles just after their preparation and their water content after various time of storage at 22° C. under 50% of relative humidity. After one week, the moisture pick-up is lower than or equal to 2.0 g water/kg of calcium carbonate (CC), preferably lower than or equal to 1.5 g water/kg of CC, more preferably lower than or equal to 1.0 g water/kg of CC and most preferably lower than or equal to 0.5 g water/kg of CC. Without being bound by any theory, it is believed that a low moisture pick-up expresses that the particles have a very low non-coated surface and therefore that the interaction of the alkaline earth metal carbonate with the acid is reduced.

According to the third way, the acid resistance of the particles of the invention, is expressed as the Differential Scanning Calorimetry (DSC) spectrum. The particles show at least one peak in the DSC spectrum between 170 and 190° C. when measured at a heating rate of 10° C./min under nitrogen atmosphere from 25 to 250° C. in open cells. Without being bound by any theory, it is believed that that DSC pattern corresponds to a high temperature transformation of a particular structure of the coating existing at low temperature and that that particular structure of the coating existing at low temperature is responsible for the acid resistance of the particles.

Consequently, the present invention concerns particles comprising an alkaline earth metal carbonate exhibiting a resistance to acids such that when suspending 1.0 g of the particles in a mixture made of 20 ml of toluene and 80 ml of an aqueous phase consisting of deionized water, 11.76 g/L of citric acid monohydrate, 2.57 g/L of NaCl and 0.068 mol/L of NaOH, after 35 minutes of stirring at 25° C. and at 1 000 rpm, the pH value of the mixture is below 7.00.

The present invention also concerns particles comprising an alkaline earth metal carbonate exhibiting a resistance to acids expressed as moisture pick-up after one week of storage at 22° C. and 50% relative humidity which is lower than or equal to 2 g water/kg of calcium carbonate.

The present invention finally also concerns particles comprising an alkaline earth metal carbonate exhibiting a resistance to acids expressed as the Differential Scanning Calorimetry (DSC) spectrum which shows at least one peak between 170 and 190° C. when measured at a heating rate of 10° C./min under nitrogen atmosphere from 25 to 250° C. in open cells.

The alkaline earth metal carbonate is preferably selected from $MgCO_3$, $CaCO_3$, $SrCO_3$, $BaCO_3$ and mixtures thereof, such as $CaMg(CO_3)_2$. $CaCO_3$ is particularly preferred.

The starting particles used for the preparation of the particles according to the invention can be any product produced by a known method, i.e. natural or synthetic material. Therefore, the invention allows the use of both e.g. natural calcium carbonate particles and synthetic calcium carbonate particles (light calcium carbonate particles and colloidal calcium carbonate particles). Natural calcium carbonate can be processed by mechanically crushing and grading calcareous ore to obtain particles adjusted to the desired size. Synthetic calcium carbonate particles are usually prepared by precipitation (precipitated calcium carbonate, PCC). PCC may be manufactured by first preparing a calcium oxide (quick lime) by subjecting limestone to calcination by burning a fuel, such as coke, a petroleum fuel (such as heavy or light oil), natural gas, petroleum gas (LPG) or the like, and then reacting the calcium oxide with water to produce a calcium hydroxide slurry (milk or lime), and reacting the calcium hydroxide slurry with the carbon dioxide discharged from a calcination furnace for obtaining the calcium oxide from limestone to obtain the desired particle size and shape PCC (carbonation process). Precipitation of calcium carbonate can also be carried out by adding an alkali metal carbonate starting with lime water (caustification method) or precipitation by the addition of an alkali metal carbonate starting with solutions containing calcium chloride. PCC obtained from the carbonation process is preferred.

The calcium carbonate can be substantially amorphous or substantially crystalline. Substantially amorphous or crystalline is understood to mean that more than 50% by weight of the calcium carbonate is in the form of amorphous or crystalline material when analysed by an X-ray diffraction technique. Substantially crystalline calcium carbonate is preferred. Crystalline calcium carbonate can consist of calcite or aragonite or a mixture of these two crystalline phases. The calcite phase is preferred.

In the case where the calcium carbonate is synthetic calcium carbonate, the particles can be of any shape. They may have the form of needles, scalenohedra, rhombohedra, spheres, platelets or prisms. A rhombohedral shape, that can be reduced to pseudo-cubes or pseudo-spheres, is preferred. The calcium carbonate can also exhibit various nanoscale structures—nano-faggots, nano-rosaries and nano-accordions—obtained by means of the method described and claimed in patent application WO 03004414. The definitions of nano-faggots, nano-rosaries and nano-accordions are given in document WO 03004414, page 5, line 33 to page 7, line 9 and are incorporated herein for reference.

The calcium carbonate particles according to the invention have usually a BET specific surface area higher than or equal to 1.0 $m^2/g$, preferably higher than or equal to 2.0 $m^2/g$, more preferably higher than or equal to 5 $m^2/g$, still more preferably higher than or equal to 10 $m^2/g$ and in particular higher than or equal to 15 $m^2/g$. The particles according to the invention have generally a BET specific surface area lower than or equal to 300 $m^2/g$ preferably lower than or equal to 250 $m^2/g$, more preferably lower than or equal to 200 $m^2/g$, still more preferably lower than or equal to 150 $m^2/g$ and in particular lower than or equal to 100 $m^2/g$. The skilled person is aware how to determine the BET specific surface area of the particles. Preferably, the BET specific surface area is measured according to the ISO 9277 norm (Standard ISO 9277, first edition, 1995-05-15).

The calcium carbonate particles have usually a mean elementary particle size ($d_p$) higher than or equal to 0.001 µm, preferably higher than or equal to 0.002 µm, more preferably higher than or equal to 0.005 µm, still more preferably higher than or equal to 0.01 µm and most preferably higher than or equal to 0.05 µm. The mean particle size is generally lower than or equal to 20 µm, preferably lower than or equal to 10 µm, more preferably lower than or equal to 5 µm and most preferably lower than or equal to 3 µm. The skilled person is aware of suitable methods for determining the mean elementary particle size. In this regard it can be referred e.g. to norm NF 11 601/11 602. More specifically, the mean elementary particle size is measured by the Léa-Nurse method (Standard NFX 11-601, 1974). The $d_P$ value is obtained from the massic area ($S_M$) derived from the Léa and Nurse method by making the assumptions that all the particles are spherical, non porous and of equal diameter, and by neglecting contact surfaces between the particles.

The relationship between $d_P$ and $S_M$ is the following:

$$d_P = 6/(\rho S_M)$$

where
$\rho$ is the specific mass of the calcium carbonate.

The calcium carbonate elementary particles can be aggregated. The mean size of the aggregated particles (approximately equal to the value of D50 defined below) is higher than or equal to 0.030 µm, preferably higher than or equal to 0.050 µm, more preferably higher than or equal to 0.070 µm, still more preferably higher than or equal to 0.100 µm and most preferably higher than or equal to 0.150 µm. The mean particle size is generally lower than or equal to 20 µm, preferably lower than or equal to 10 µm, more preferably lower than or equal to 5 µm, still more preferably lower than or equal to 3 µm and most preferably lower than or equal to 1 µm. D50 is the particle size value less than or equal to which there are 50% by weight of the particles. D50 is the particle size value which expresses that 50% by vol of the particles have a size value lower than or equal to D50. The skilled person is aware of suitable methods for determining D50. It can be for instance be obtained from well known standard methods employed in the art of sedimentation of the particles in a fully dispersed state in an aqueous medium using a SEDIGRAPH 5100 machine as supplied by Micromeritics Corporation, USA or a CAPA 700 machine as supplied by Horiba, JP. The mean diameter of the aggregates is obtained on the basis of the size distribution of the particles determined by the sedimentation method using a Micromeritics SediGraph 5 100 measuring device for sizes ranging from 0.1 to 300 µm (standard ISO 13317-3) and using a Horiba CAPA 700 measuring device for sizes ranging from 0.01 to 300 µm (standard ISO 13318-2).

In a preferred embodiment of the particles according to the invention the coating comprises a first coating agent selected from alkylsulfates, sulfonic acids, carboxylic acids, their salts, or mixtures thereof. Carboxylic acids are preferred and aliphatic carboxylic acids are most preferred.

The aliphatic carboxylic acid may be any linear or branched or cyclic, substituted or non substituted, saturated or unsaturated, carboxylic acid. The aliphatic carboxylic acid has usually a number of carbon atoms greater than or equal to 4, preferably greater than or equal to 8, more preferably greater than or equal to 10 and most preferably greater than or equal to 14. The aliphatic carboxylic acid has generally a number of carbon atoms lower than or equal to 32, preferably lower than or equal to 28, more preferably lower than or equal to 24 and most preferably lower than or equal to 22.

In a first embodiment, according to the invention, the first coating agent is an aliphatic carboxylic acid selected from the group of substituted, non substituted, saturated and unsaturated fatty acids or mixture thereof. More preferably it is selected from the group consisting of caproic acid, caprylic acid, capric acid, lauric acid, myristic acid, palmitic acid, stearic acid, iso-stearic acid, hydroxystearic acid, arachidic acid, behenic acid, lignoceric acid, cerotic acid, montanic acid, melissic acid, myristoleic acid, palmitoleic acid, petroselinic acid, petroselaidic acid, oleic acid, elaidic acid, linoleic acid, linolelaidic acid, linolenic acid, linolenelaidic acid, a-eleostaeric acid, b-eleostearic acid, gadoleic acid, arachidonic acid, erucic acid, brassidic acid and clupanodonic acid, mixtures thereof or salts derived therefrom. Mixtures containing mainly palmitic, stearic and oleic acids are more preferred. Mixtures called "stearine" which consist of about 30-40 wt % stearic acid, of about 40-50 wt % palmitic acid and of about 13-20 wt % oleic acid are particularly preferred.

In a second embodiment, according to the invention, the first coating agent is a rosin acid selected from the group consisting of levopimaric acid, neoabietic acid, palustric acid, abietic acid, dehydroabietic acid, mixtures thereof or salts derived therefrom.

In case that the first coating agent is a salt of an aliphatic carboxylic acid, this may be the salt of an alkaline earth metal corresponding to the cations of the carbonate core and the carboxylic acid as the anion, i.e. a calcium, magnesium, strontium or barium salt of the carboxylic acid. However, the first coating agent may also be present e.g. in form of the sodium, potassium or ammonium salt of the aliphatic carboxylic acid.

The first coating agent may be applied to the particles by any suitable method. Preferably, the alkaline earth metal carbonate is brought into contact with the coating agent in a known manner. The coating agent is dispersed or emulsified in liquid or solid form, preferably as an emulsion with the dispersed alkaline earth metal carbonate, for example, during the grinding process or during and/or after the precipitation, the coating agent adhering to the surface of the alkaline earth metal carbonate.

In one embodiment, the treatment of the alkaline earth metal carbonate with the first coating agent takes place in emulsified form in an aqueous system. For further details, it can be referred to e.g. U.S. Pat. No. 6,342,100 with is fully incorporated by reference herein.

In a preferred embodiment of the particles according to the invention the coating comprises a second coating agent which may differ from the first coating agent and is selected from carboxylic acids, sulfonic acids, their salts, alkylsulfates or mixtures thereof. Carboxylic acids are preferred and aliphatic carboxylic acid are most preferred. The aliphatic carboxylic acids are defined as above.

When the coating comprises a first coating agent and a second coating agent, preferably the first coating agent covers at least 0.5% of the outer surface area of the alkaline earth metal carbonate core, more preferably at least 25%, and still more preferably at least 30%. The first coating agent covers at most 75% of the outer surface area of the alkaline earth metal carbonate core, more preferably at most 65%, and still more preferably at most 50%.

Preferably the second coating agent covers at least 25% of the outer surface area of the alkaline earth metal carbonate core, more preferably at least 35%, and still more preferably at least 50%. The second coating agent covers at most 99.5% of the outer surface area of the alkaline earth metal carbonate core, more preferably at most 75%, and still more preferably at most 70%.

Preferably, the particles according to the invention are coated with a coating, the content of which being usually higher than or equal to 0.0001 wt %, preferably higher than or equal to 0.001 wt %, yet preferably higher than or equal to 0.01 wt % and most preferably higher than or equal to 0.05 wt %, based on the total weight of the particles. The coating content of the particles according to the invention is generally lower than or equal to 60 wt %, preferably lower than or equal to 25 wt %, yet preferably lower than or equal to 10 wt % and most preferably lower than or equal to 6 wt %, based on the total weight of the particles. In this regard the term "coating" is to be understood as encompassing any substance differing from the alkaline earth metal carbonate(s) of the core.

Preferably, the coating of the particles according to the invention does not contain a compound selected from the group consisting of phthalic esters, phosphoric esters, adipic esters, sebacic esters, azelaic esters, trimellitic esters, metal alkoxides and vinyl esters of long chain carboxylic acids having 8 to 22 carbon atoms and from the group of polydialkyldsiloxanes.

The particles according to the invention are characterized by a very low water content. Therefore, they can be used in polymer compositions which require low amounts of water or the absence of any water. The water content of the particles is generally lower than or equal to 1.0 wt %, preferably lower than or equal to 0.5 wt %, more preferably lower than or 0.25 wt %, still more preferably lower than or equal to 0.15 wt %, most preferably lower than or equal to 0.1 wt % and in particular lower than or equal to 0.05 wt % based on the total weight of the particles. The water content can be measured according to Norm ISO 787/5.

Furthermore, the particles according to the invention show an excellent dispersibility as measured by Hegman gauge value. The dispersibility is usually lower than or equal to 60 µm, preferably lower than or equal to 50 µm, more preferably lower than or equal to 40 µm, yet more preferably lower than or equal to 30 µm, still more preferably lower than or equal to 20 µm and most preferably lower than or equal to 10 µm. The skilled person is aware of suitable method for measuring the dispersibility. In this regard, it can be referred to Norm ISO 1524.

Figure 2:
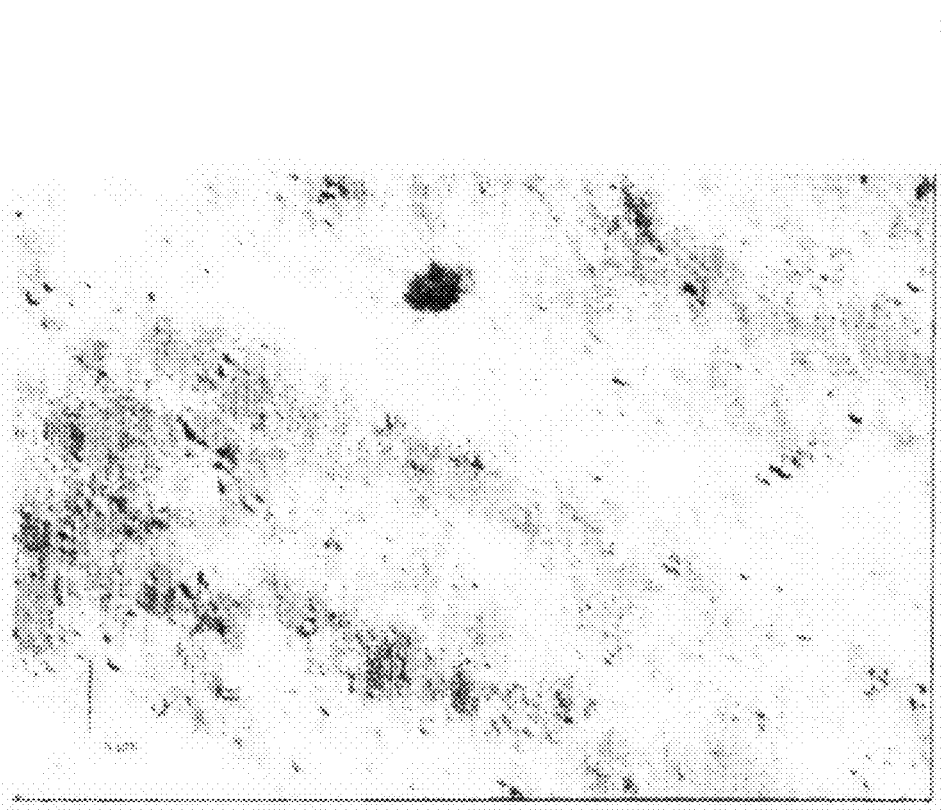
FIG. 2 shows a picture of a polymer composition containing the particles obtained in example 1.

The particles according to the invention also exhibit a good dispersion in polymers as could be seen from optical microscope observations of a microtomic cut of PCC filled polymer. A picture of such a microtomic cut is shown in FIG. 2.

The invention also relates to a process for the preparation of the particles described above.

The particles according to the invention may be prepared by a process comprising the steps of:
(a) contacting particles of an alkaline earth metal carbonate with a first coating agent in a first coating medium
(b) removing at least one fraction of said first coating medium, said traction being different from the coated particles of the alkaline earth metal carbonate resulting from step (a)
(c) contacting the remaining fraction of the first coating medium obtained from step (b) with a second coating agent in a second coating medium.

The first coating medium contains at least, the alkaline earth metal carbonate, the first coating agent and water.

The second coating medium contains at least, the remaining fraction of the first coating medium obtained from step (b), the second coating agent and optionally water.

In a preferred embodiment of the process according to the invention, the water content of the first coating medium (step a) is higher than the water content of the second coating medium (step c).

The water content of the first coating medium in step (a) is usually higher than or equal to 500 g/kg, preferably higher than or equal to 750 g/kg, more preferably higher than or equal to 850 g/kg and most preferably higher than or equal to 950 g/kg.

The water content of the of the second coating medium in step (c) is generally lower than or equal to 850 g/kg, preferably lower than or equal to 500 g/kg, more preferably lower than or equal to 300 g/kg, yet more preferably lower than or equal to 100 g/kg and most preferably lower than or equal to 10 g/kg.

No extra water is substantially added to the second coating medium in step (c). Extra water means any water not arising from the remaining fraction of the first coating medium obtained from step (b) and from the second coating agent used in step (c). Substantially means that the extra water in the second coating medium is usually lower than or equal to 100 g/kg, preferably lower than or equal to 10 g/kg and most preferably lower than or equal to 1 g/kg.

The remaining fraction of the first coating medium obtained from step (b) and entering step (c) is preferably a dry solid or a moist cake.

By dry solid, one intends to denote a solid with a water content usually lower than or equal to 10% by weight. This content is preferably lower than or equal to 3% by weight and more particularly lower than or equal to 1% by weight. In that case, the process preferably comprises a drying step between steps (b) and (c).

By moist cake, one intends to denote a solid with a water content normally greater than 10% by weight, more specifically greater than or equal to 30% by weight. This content is generally lower than or equal to 80% by weight and preferably lower than or equal to 50% by weight.

It is preferred that the remaining fraction of the first coating medium obtained from step (b) and entering step (c) is a dry solid.

In another preferred embodiment of the process according to the invention, the water content of the coating medium in step (c) is higher than the water content of the coating medium in step (a). In that case, step (b) can be skipped. The alkaline earth metal carbonate entering step (a) can be a dry solid or a moist cake, as defined above.

The first and the second coating agent which are applied to the alkaline earth metal carbonate in steps (a) and (c) may be different or identical. In a preferred embodiment the first coating agent is the same as the second coating agent. In another preferred embodiment the first coating agent differs from the second coating agent.

When the water content of the first coating medium (step a) is higher than the water content of the second coating medium (step c), the second coating agent is applied to the particles by means of a drying cellular mill or drying air jet mill (e.g. Atritor Multirotor Cellmill, Jäckering Ultrarotor, . . . ). The temperature at the outlet of the mill is usually higher than or equal to 100° C., preferably higher than or equal to 120° C. and most preferably higher than or equal to 130° C. This temperature is generally lower than or equal to 350° C., preferably lower than or equal to 250° C. and most preferably lower than or equal to 200° C. With such an outlet temperature mill, it is believed that the temperature within the mill is sufficient to ensure the total reaction and a good repartition of the second coating agent onto the alkaline earth metal carbonate.

Preferably, the uncoated alkaline earth metal carbonate particles (e.g. calcium carbonate particles) are contacted with an emulsion of the first coating agent. Then, the particles are separated from the emulsion and dried. Preferably, drying is performed at a temperature of 105° C. at ambient pressure, preferably until the water content of the particles is below 1.5 g/kg. After the drying step the coated particles are introduced into an industrial cellular mill. Prior to or during the milling process the cellular mill is supplied with the second coating agent, preferably one or more aliphatic carboxylic acid which may be liquid or solid at ambient temperature. There are various possibilities of applying the second coating agent on the particles:

spraying the liquefied second coating agent by means of a jet ("atomization");

mixing the dry particles with the second coating agent in solid form prior to milling; and adding the liquid or solid second coating agent continuously or stepwise to the mill.

In general, the properties of the coated particles may be adjusted by varying the following parameters:

temperature of the coating step when applying the first/second coating agent (solid phase);

time of the particles being thermally treated and residing in the milling apparatus;

type of first/second coating agent;

amount of first/second coating agent; and specific surface area of the alkaline earth metal carbonate.

The invention also relates to particles which are obtainable by the above process.

The invention also relates to a polymer composition comprising the acid resistant particles as defined above.

Preferably, the polymer compositions according to the invention contain the particles in an amount based on the total weight of the composition which is generally higher than or equal to 0.001 wt %, preferably higher than or equal to 0.1 wt %, more preferably higher than or equal to 1.0 wt % and most preferably higher than or equal to 5.0 wt %. This amount is usually lower than or equal to 99 wt %, preferably lower than or equal to 95 wt % and most preferably lower than or equal to 50 wt %.

Preferably, the polymer compositions according to the invention contain one or more polymers selected from the group consisting of polyethylene, polypropylene, polyvinyl halogenides, polysilicones, modified polysilicones, polyvinyl alcohol, polystyrene, polyurethanes, polycarbonates, polyureas, polyesters, polyamides, polyacrylates, polyacrylics and mixtures or copolymers thereof. The polymers may be optionally cross-linked by means of suitable cross-linking agents.

Polypropylene (PP), polyvinyl chloride (PVC), modified polysilicones, polysilicones, polyacrylics and/or polyurethane (PU) are preferred. PVC, modified polysilicones, polysilicones, polyacrylics and/or polyurethane used in plastisols and sealants applications are particularly preferred. Polyurethane used in plastisols and sealants and polypropylene are the most preferred.

Preferably, the weight average molecular weight of the polymers contained in the compositions according to the invention is within the range of from 1,000 to 5,000,000 g/mol, more preferably 2,500 to 2,500,000 g/mol, still more preferably 5,000 to 1,000,000 g/mol, yet more preferably 10,000 to 750,000 g/mol, most preferably 25,000 to 500,000 g/mol and in particular 50,000 to 250,000 g/mol.

The polymer compositions containing the acid resistant particles according to the invention exhibit higher yield stress, more stable in time viscosities and better dispersibility than compositions of prior art.

A composition comprising 55 wt % of a polymer, preferably a polyurethane, more preferably a mixture of isocyanate (Isonate 143L, Papi, Desmocap 11, Desmocap 1280, Katenate L, Desmodur E-22, Desmodur TP, KL5-2493, Desmodur vl-50, Desmodur HL, Desmodur N, Desmodur VKS 70, Lupranate T80-2, Lupranate 8020, No 219 isocyanate, Lupranate M20S, No 78 Isocyanate) and polyol (PCP 301, PolyG 85-28, LU 5800, LU 10000, Desmophen 1150, Pluracol P1010, Phiracol P 2020, Quadrol, PPG 2025, PPG 2035, PPG 4025, E-351, LHT 42, LHT 28, Polymeg 2000, Baycoll AD 3040, Baycoll AS 2060, Baycoll DS 1165), 22% of the particles according to the invention, 1% of a filler such as $TiO_2$, $SiC_2$, natural calcium carbonate or talc, 6 wt % of dessicant such as CaO and 15 wt % of other additives such as stabilizers, exhibits usually a yield stress higher than or equal to 50 Pa, preferably higher than or equal to 75 Pa, more preferably higher than or equal to 100 Pa, still more preferably higher than or equal to 125 Pa, most preferably higher than or equal to 145 Pa and in particular within the range of from 145 to 175 Pa. The skilled person is aware of suitable methods for determining the yield stress. In this regard it can be referred e.g. to Norm ISO 3219.

The above polymer composition is characterized in that the yield stress is stable for a certain period of time. Preferably, after 14 days the yield stress of the compositions has usually been decreased by less than 25%, preferably by less than 20%, more preferably by less than 15%, still more preferably by less than 10%, most preferably by less than 5.0% and in particular by less than 3.0%.

The viscosity of the above polymer compositions at 100 $s^{-1}$, when measured according to standard ISO 3219, is generally higher than or equal to 1.0 Pa·s, preferably higher than or equal to 2.0 Pa·s, more preferably higher than or equal to 3.0 Pas, yet more preferably higher than or equal to 4.0 Pa·s, most preferably higher than or equal to 5.0 Pa·s and in particular within the range of from 5.5 to 7.0 Pa·s.

The dispersibility of the particles according to the invention in the above polymer compositions, as measured according by Hegman gauge value is usually below 60 μm, preferably below 40 μm, more preferably below 20 μm, still more preferably below 10 μm, most preferably below 5 μm and in particular below 1 μm. The skilled person is aware of suitable methods for determining the dispersion. In this regard it can be referred e.g. to Norm ISO 1524.

The polymer compositions comprising the acid resistant particles according to the invention exhibit a higher Young Modulus and higher impact strength than compositions comprising particles of the prior art.

A composition comprising a polymer, preferably polypropylene, and more preferably a copolymer of propylene and 20 wt % of the particles according to the invention, which composition has been extruded or mixed in a Brabander, at 25° C. exhibits generally a Young modulus higher than or equal to 600 MPa, preferably higher than or equal to 700 MPa, more preferably above 800 MPa, still more preferably higher than or equal to 900 MPa, most preferably above 1,000 MPa and in particular within the range of from 1,000 to 1,200 MPa. The skilled person is aware of suitable methods for determining the Young modulus. In this regard it can be referred e.g. to standard ISO 527-1.

A composition comprising a polymer, preferably polypropylene and 45 wt % of the particles according to the invention, which composition has been extruded or mixed, at 25° C. exhibits usually an impact resistance higher than or equal to 2.0 kJ/m$^2$, more preferably higher than or equal to 5.0 kJ/m$^2$, still more preferably higher than or equal to 10 kJ/m$^2$, yet more preferably higher than or equal to 15 kJ/m$^2$, most preferably higher than or equal to 20 kJ/m$^2$ and in particular within the range of from 20 to 25 kJ/m$^2$. The skilled person is aware of suitable methods for determining the impact resistance. In this regard it can be referred e.g. to standard ISO 179. The surface treatment according to the invention improves the impact resistance of the polymer compositions when compared with compositions containing conventional alkaline earth metal carbonate particles. In particular, the improved properties are achieved at a content of the particles between 5 and 45 wt %.

The invention also relates to the use of the acid resistant alkaline earth metal carbonate particles and to the use of compositions containing said particles.

The calcium carbonate, coated pursuant to the invention, has a high functionality as a mixing component, and can be used as a filler in polymers, polymer preparations, plastics, plastisols, coating compositions, sealing compositions, paper, paints, pigments and especially printing inks.

Preferably, the particles according to the invention are used as additives in polymer compositions. For example, the particles can be used as fillers in polymer compositions. Such compositions exhibit excellent rheological and mechanical properties, particularly a high yield stress and a high viscosity. These properties are comparably stable as they only slightly decrease with time.

The mechanical properties of polymer compositions containing PCC as filler can be improved by using coated PCC: particularly in polypropylene compositions the impact strength and the Young (tensile) modulus can be simultaneously improved. In sealants and plastisols, where the level of water content must be as low as possible (preferably less than 1.5 g/kg), such coated PCC could be a substitute of silica. Mastics of polyurethanes or silicones are preferred sealants.

The following examples further illustrate the invention but are not to be construed as limiting its scope.

EXAMPLE 1

Particles According to the Invention

In a first step, 500 liters of a suspension at 200 g/L of a non coated precipitated calcium carbonate characterised by an elementary particle size ($d_P$) of 70 nm and a specific surface area (BET) of 20 m$^2$/g have been treated with 2.8 kg of stearine/100 kg of PCC, i.e. with 28 L of an aqueous emulsion containing 10 wt % of stearine (first coating agent). The particles have been contacted with the emulsion at 75° C. for 45 minutes.

Then, the particles have been separated from the emulsion by a filter, dried at 105° C. in a oven until the water content is below 3 g/kg and grinded.

In a second step, 3.35 kg of stearine (second coating agent) have been injected in a Cell Mill dryer with 100 kg of previous coated PCC. The outlet temperature has been regulated at 180-200° C. After 2 minutes, the total solid has been recovered.

COMPARATIVE EXAMPLE 1

Particles not According to the Invention

The particles have been prepared following the first step of example 1.

COMPARATIVE EXAMPLE 2

Particles not According to the Invention

A natural coated calcium carbonate Filmlink® C400 from Imerys has been used.

COMPARATIVE EXAMPLE 3

Particles not According to the Invention

The particles have been prepared following the second step of example 1 except that the non coated calcium carbonate of the first step has been used.

COMPARATIVE EXAMPLE 4

Particles not According to the Invention

A precipitated coated calcium carbonate Viscolite® OS from Shiraishi has been used.

EXAMPLES 2 TO 5

The particles have been prepared according to the procedure of example 1 except that the precipitated calcium carbonate particles have been coated with respectively 4.5, 4.8, 5.5 and 6.9 kg of stearine per 100 kg of precipitated calcium carbonate.

EXAMPLE 6

The particles have been prepared according to the procedure of example 1 except that the precipitated calcium carbonate particles have been coated with rosin acid instead of stearine, 5.5 kg of rosin acid/100 kg of precipitated calcium carbonate.

Acid Resistance Test

An aqueous solution has been prepared as follows. 11.76 g of citric acid monohydrate, 2.57 g of NaCl, 68 mL of NaOH (1N) have been added in a 1 L metered flask and deionized water was added to a volume of 1 L.

In a beaker (5 cm inner diameter, 9 cm height), 20 mL of toluene, 80 mL of the above aqueous solution have been added. The mixture has been magnetically stirred at 1000 rpm (Bioblock Scientific AM 3001 magnetic stirrer, triangular stirring bar 2.5 cm long vs 0.9 cm wide) at 25° C. in order to get an emulsion. A pH probe (PHM 250 from Radiometer Analytical) was inserted into the mixture. The pH was 3.80+/−0.05.

1+/−0.05 g of the solid to be tested has been added to the emulsion and the pH value has been recorded each minute until it reached a value of 7.00.

The results are shown in Table 1.

DSC Measurement

A DSC device of the type TA Instrument 2010 has been used. 10 mg of the particles have been added in an open cell and the heat flow has been measured at a heating rate of 10° C./min under nitrogen from 25 to 250° C. using an empty cell as reference.

The results are shown in FIG. 1. Curve (a), (b), (c) and (d) refer respectively to particles obtained in example 1, comparative example 3, comparative example 1 and comparative example 2.

Water Content Measurement 10 g of particles have been introduced in a glass cell. The cell has been put in a oven at 105° C. for 3 hours before being cooled and weighted. The water content has been determined by difference of weight between the initial and the dried sample (see norm ISO 787/5).

The results are shown in Table 2.

Water Pick Up Measurement

The water pick up of the particles has been obtained by measuring the weight increase of particles previously dried at 105° C. for 3 h, after 1, 2, 3 and 4 weeks of storage at 22° C. in sealed bags, or in open air under 50% of relative humidity. The results are shown in Table 2 (sealed bags) and in Table 3 (open air).

Mechanical Properties of Polypropylene (PP)

Various amounts of polypropylene (KS001P from British Petroleum) and of coated calcium carbonate have been mixed, extruded (190-200° C.) and then compressed under the following conditions:

190° C., 20 bar, 5-6 min
190° C., 80 bar, 5-6 min
cooling.

Stretching tests: have been performed according to Norm ISO 527-1 and impact tests have been performed according to Norm ISO 179.

Young modulus values have been obtained from stretching stress/deformation curves at room temperature (25° C.) and ambient relative humidity (50%) with a traction rate of 1 mm/min (average of five samples). The results are shown in Table 4

Shock resistance has been measured from notched Charpy tests carried out at room temperature (25° C.) and ambient relative humidity (50%). A hammer of 1 J has been used (average of 10 samples). The results are shown in Table 5.

Dispersion in a Polymer Matrix

Figure 3:
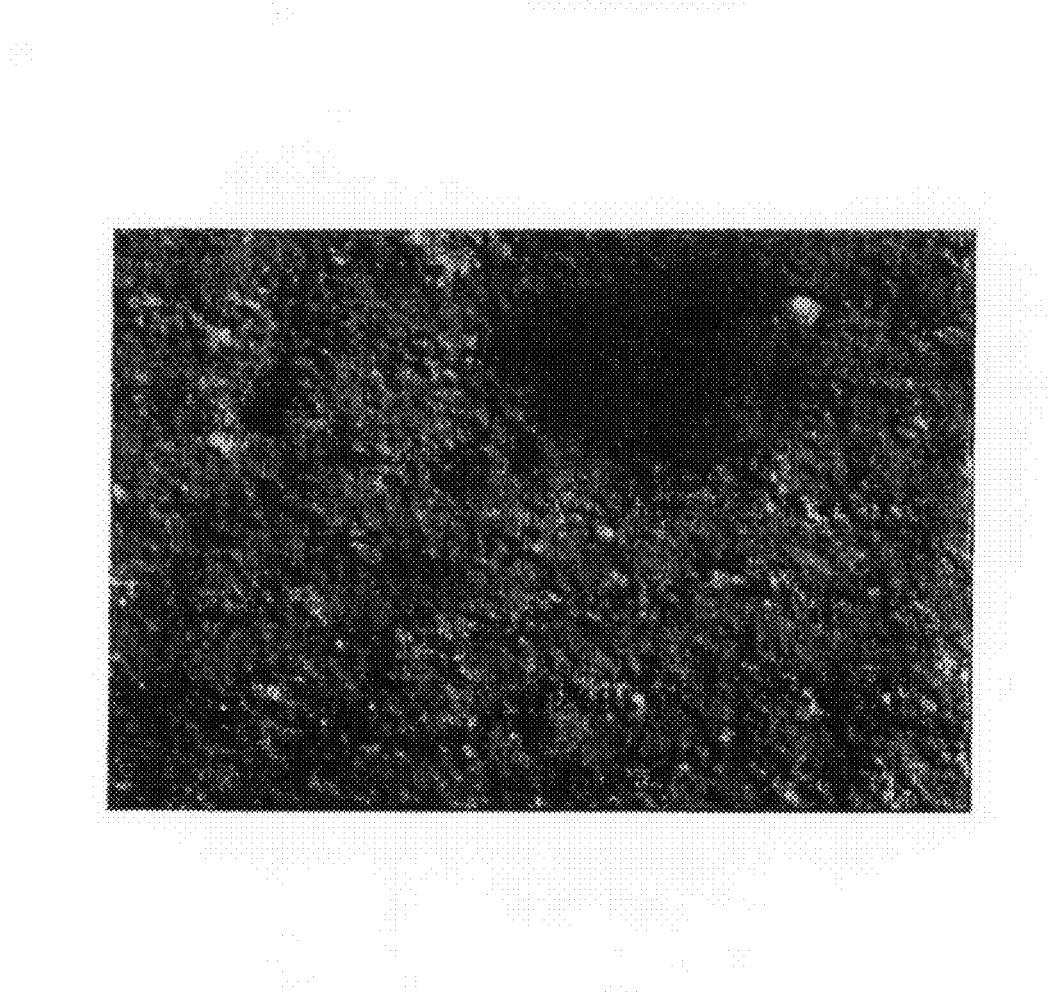
FIG. 3 shows a picture of a polymer composition containing the particles obtained in comparative example 1.

Microtomic cuts (10 μm thick) have been obtained from extruded samples of PP containing coated calcium carbonate. Pictures have been performed with an optical microscope (LEICA). FIG. 2 is a picture of a polymer composition containing the particles obtained in example 1 and FIG. 3 is a picture a polymer composition containing the particles obtained in comparative example 1.

Rheological Properties of Polyurethane Sealants

PU sealant composition (2 components) containing 55 wt % of PU, 22% of PCC, 1% of filler, 6 wt % of dessicant and 15 wt % of other additives have been prepared.

The rheological properties have been measured following Norm ISO 3219, using a Bohlin CVO 120HR instrument (measuring system: cone-plate 4°, 20 mm diameter) following the next procedure:

increase the shearing rate from 0 to 100 s$^{-1}$ in 2 min
keeping the shearing rate constant at 100 s$^{-1}$ for 1 min
decreasing the shearing rate from 100 to 0 s$^{-1}$ in 2 min.

The yield stress has been obtained according to the mathematical model of Bingham applied to the decreasing curve (data points between 99 and 77 s$^{-1}$)

The yield stress, viscosity and dispersibility of the compositions are summarized in Table 6.

Rheological and Mechanical Properties of Modified Silicones Polymer Compositions Modified Silicones Polymers compositions containing 30 to 35% by weight of polymers, 14 to 18% by weight of plasticizer, 35 to 40% by weight of coated calcium carbonate particles, 0 to 4% by weight of silanes and 0 to 2% by weight of wax have been prepared.

The flowability (Severs viscosity) has been measured using a Severs Rheometer fitted with a conical nozzle having a length of 69.4 mm, an upper diameter of 12 mm and a lower diameter of 6.5 mm and at a relative pressure of 2 bar.

Stretching tests have been performed on tests bars of type II according to standard ISO 37-1994 with a stretching speed of 200 mm/min. Results are averaged from 5 tests bars.

The flowability of the compositions, the tensile strength and the strain at break are summarized in Table 7.

Rheological Properties of Acrylic Plastisol Compositions

Acrylic Plastisol compositions containing 30 to 50% by weight of acrylic resin (alkylester of acrylic acid and methylmethacrylate), 30 to 60% by weight of plasticizer, 1 to 2% by weight of dessicant, 13 to 20% by weight of coated calcium carbonate particles and 40 to 70% by weight of natural ground calcium carbonate have been prepared.

The flowability (Severs viscosity) has been measured using a Severs Rheometer fitted with a nozzle having a length of 45 mm and an aperture of 3.0 mm diameter and at a relative pressure of 4.9 bar.

The Brookfield viscosity has been measured with a Brookfield Viscosimeter at a rotating speed of 2 rpm.

The flowability and the viscosity at various time of storage at 22 and 35° C. are summarized in Table 8.

Rheological Properties of Polyvinyl Chloride Plastisol Compositions

Polyvinyl Chloride Plastisol compositions containing 15 to 25% by weight of coated calcium carbonate particles, 25 to 35% by weight of polymer (Vestolit, Vinolit), 30 to 40% by weight of plasticizer (di-octylphthalalte, di-isononylphthalate, adipate, sebacate), 3 to 6% by weight of solvent (derivative of hydrocarbons), 0 to 16% by weight of filler (TiO$_2$, SiO$_2$, natural ground calcium carbonate), 1 to 6% by weight of promoter (polyamine, polyamide), 1 to 2% by weight of dessicant (CaO) and 0 to 5% by weight of further additives have been prepared.

The flowability (Severs viscosity) has been measured using a Severs Rheometer fitted with a nozzle having a length of 50 mm and an aperture of 1.6 mm diameter and at a relative pressure of 5.5 bar.

The viscosity has been measured with a Brookfield Viscosimeter at a rotating speed of 2 rpm.

The flowability and the viscosity are summarized in Table 9.

TABLE 1

| | pH | | | |
|---|---|---|---|---|
| Time (min) | Example 1 | Comparative example 1 | Comparative example 2 | Comparative example 3 |
| 0 | 3.82 | 3.84 | 3.8 | 3.76 |
| 1 | 3.87 | 4.38 | 4.07 | 3.93 |
| 2 | 3.95 | 4.73 | 4.34 | 4.1 |
| 3 | 4.02 | 5.03 | 4.55 | 4.22 |
| 4 | 4.09 | 5.35 | 4.73 | 4.33 |
| 5 | 4.16 | 5.69 | 4.9 | 4.42 |
| 6 | 4.22 | 5.99 | 5.08 | 4.51 |

TABLE 1-continued

| | pH | | | |
|---|---|---|---|---|
| Time (min) | Example 1 | Comparative example 1 | Comparative example 2 | Comparative example 3 |
| 7 | 4.29 | 6.23 | 5.25 | 4.59 |
| 8 | 4.35 | 6.43 | 5.43 | 4.68 |
| 9 | 4.4 | 6.6 | 5.61 | 4.76 |
| 10 | 4.46 | 6.75 | 5.78 | 4.84 |
| 11 | 4.52 | 6.89 | 5.95 | 4.92 |
| 12 | 4.57 | 7 | 6.09 | 5.01 |
| 13 | 4.63 | | 6.22 | 5.1 |
| 14 | 4.68 | | 6.34 | 5.19 |
| 15 | 4.73 | | 6.45 | 5.29 |
| 16 | 4.79 | | 6.55 | 5.39 |
| 17 | 4.84 | | 6.64 | 5.5 |
| 18 | 4.89 | | 6.72 | 5.61 |
| 19 | 4.94 | | 6.8 | 5.72 |
| 20 | 4.99 | | 6.88 | 5.84 |
| 21 | 5.04 | | 6.95 | 5.96 |
| 22 | 5.1 | | 7.02 | 6.07 |
| 23 | 5.15 | | | 6.18 |
| 24 | 5.21 | | | 6.29 |
| 25 | 5.26 | | | 6.39 |
| 26 | 5.32 | | | 6.48 |
| 27 | 5.38 | | | 6.57 |
| 28 | 5.44 | | | 6.65 |
| 29 | 5.5 | | | 6.73 |
| 30 | 5.57 | | | 6.8 |
| 31 | 5.63 | | | 6.86 |
| 32 | 5.7 | | | 6.92 |
| 33 | 5.77 | | | 6.97 |
| 34 | 5.84 | | | 7.02 |
| 35 | 5.92 | | | |
| 36 | 5.99 | | | |
| 37 | 6.07 | | | |
| 38 | 6.15 | | | |
| 39 | 6.22 | | | |
| 40 | 6.3 | | | |
| 41 | 6.38 | | | |
| 42 | 6.46 | | | |
| 43 | 6.53 | | | |
| 44 | 6.6 | | | |
| 45 | 6.67 | | | |
| 46 | 6.74 | | | |
| 47 | 6.81 | | | |
| 48 | 6.87 | | | |
| 49 | 6.92 | | | |
| 50 | 6.98 | | | |
| 51 | 7.03 | | | |

TABLE 2

| | Water content (g/kg CC) | |
|---|---|---|
| Time | Example 1 | Comparative example 3 |
| Just after preparation | 0.8 | 0.9 |
| 1 week after preparation | 0.9 | 1.3 |
| 2 weeks after preparation | 1.1 | 1.8 |
| 3 weeks after preparation | 1.2 | 2.0 |
| 4 weeks after preparation | 1.9 | 1.9 |

TABLE 3

| | Water content (g/kg CC) | |
|---|---|---|
| Time | Example 1 | Comparative example 1 |
| Just after preparation | 1.0 | 4.5 |
| 1 week after preparation | 1.1 | 5.0 |
| 2 weeks after preparation | 1.1 | 4.5 |
| 3 weeks after preparation | 1.2 | 5.0 |
| 4 weeks after preparation | 1.2 | 5.0 |

TABLE 4

| | Young Modulus (GPa) | |
|---|---|---|
| Filler content (wt %) | Example 1 | Comparative example 1 |
| 0 | 0.80 | 0.80 |
| 10 | 1.00 | 0.88 |
| 20 | 1.10 | 1.01 |
| 25 | 1.25 | 1.08 |

TABLE 5

| | Impact strength (kJ/m$^2$) | |
|---|---|---|
| Filler content (wt %) | Example 1 | Comparative example 1 |
| 0 | 1.0 | 1.0 |
| 15 | 7.5 | 3.0 |
| 25 | 12.5 | 6.0 |
| 45 | 22.0 | 3.0 |
| 50 | 6.0 | 4.0 |

TABLE 6

| | Example 1 | Comparative example 1 |
|---|---|---|
| Yield stress (Pa) just after preparation | 149 | 57 |
| Yield stress (Pa) after 2 weeks | 134 | 63 |
| Viscosity at 100 s−1 (Pa · s) just after preparation | 4.8 | 3.5 |
| Viscosity at 100 s−1 (Pa · s) after 2 weeks | 4.8 | 4.1 |
| Dispersibility (μm) | <10 | 60 |

TABLE 7

| | Comparative example 1 | Example 3 | Example 5 | Example 6 |
|---|---|---|---|---|
| Flowability (g/min) | 1598 | 2235 | 2249 | 2070 |
| Tensile strength (MPa) | 1.47 | 1.43 | 1.69 | 1.93 |
| Strain at break (%) | 880 | 1112 | 1205 | 1096 |

TABLE 8

| | | Comparative example 1 | Comparative example 4 | Example 4 | Example 2 |
|---|---|---|---|---|---|
| Flowability (g/min) | Initial | 308 | 681 | 471 | 479 |
| | After 7 days at 22° C. | 237 | 455 | 466 | 470 |

TABLE 8-continued

|  | | Comparative example 1 | Comparative example 4 | Example 4 | Example 2 |
|---|---|---|---|---|---|
|  | After 14 days at 22° C. | 250 | 497 | 470 | 486 |
| Brookfield Viscosity (Pa·s) | Initial | 1447 | 922 | 1025 | 973 |
|  | After 7 days at 22° C. | 1768 | 835 | 980 | 910 |
|  | After 14 days at 22° C. | 1478 | 865 | 1027 | 1024 |
|  | After 10 days at 35° C. | 2675 | 973 | 1198 | 1200 |

TABLE 9

|  | Comparative example 1 | Comparative example 4 | Example 4 | Example 5 |
|---|---|---|---|---|
| Flowability (g/min) | 3.5 | 13.3 | 13.5 | 17 |
| Brookfield Viscosity (Pa·s) | 2960 | 1355 | 1460 | 1750 |

The invention claimed is:

1. A coated particle comprising an alkaline earth metal carbonate core coated with:
   a first coating agent selected from the group consisting of alkylsulfates, carboxylic acids, their salts, and mixtures thereof, and
   a second coating agent selected from the group consisting of alkylsulfates, carboxylic acids, their salts, and mixtures thereof,
   wherein said coated particle exhibits a resistance to acids such that when suspending 1.0 g of the particles in a mixture made of 20 ml of toluene and 80 ml of an aqueous phase consisting of deionized water, 11.76 g/L of citric acid monohydrate, 2.57 g/L of NaCl and 0.068 mol/L of NaOH, after 35 minutes of stirring at 25° C. and at 1 000 rpm, the pH value of the mixture is below 7.00.

2. The particle according to claim 1, exhibiting at least one of the following characteristics:
   a coating content within the range of from 0.0001 wt % to 60 wt % based on the total weight of the particles
   a water content lower than or equal to 1.0 wt % based on the total weight of the particles,
   a dispersibility lower than or equal to 60 μm,
   a BET specific surface area higher than or equal to 1 m$^2$/g and lower than or equal to 300 m$^2$/g, if necessary before coating,
   a mean elementary particle size ($d_p$) within the range of from 0.001 μm to 50 μm before coating.

3. The particle according to claim 1, wherein the first coating agent covers at least 25% and at most 65% of the outer surface area of the alkaline earth metal carbonate core, and wherein the second coating agent covers at least 35% and at most 75% of the outer surface area of the alkaline earth metal carbonate core.

4. The particle according to claim 1, obtained by carrying out coating of the alkaline earth metal carbonate core in at least two distinct consecutive steps.

5. The particle according to claim 4, wherein said core is first coated with said first coating agent and, consecutively thereafter, said second coating agent.

6. The particle according to claim 5, wherein the first and the second coating agents are different.

7. The particle according to claim 5, wherein the first and the second coating agents are identical.

8. The particle according to claim 7, wherein the first coating agent covers at least 25% and at most 65% of the outer surface area of the alkaline earth metal carbonate core, and wherein the second coating agent covers at least 35% and at most 75% of the outer surface area of the alkaline earth metal carbonate core.

9. The particle according to claim 7, wherein the first and the second coating agents are carboxylic acids.

10. A coated particle comprising an alkaline earth metal carbonate core coated with:
    a first coating agent selected from the group consisting of alkylsulfates, carboxylic acids, their salts, and mixtures thereof, and
    a second coating agent selected from the group consisting of alkylsulfates, carboxylic acids, their salts, and mixtures thereof,
    wherein said coated particle exhibits a resistance to acids expressed as a moisture pick-up after one week of storage at 22° C. and 50% relative humidity which is lower than or equal to 2 g water/kg of calcium carbonate.

11. The particle according to claim 10, obtained by carrying out coating of the alkaline earth metal carbonate core in at least two distinct consecutive steps.

12. The particle according to claim 11, wherein said core is first coated with said first coating agent and, consecutively thereafter, said second coating agent.

13. The particle according to claim 12, wherein the first and the second coating agents are different.

14. The particle according to claim 12, wherein the first and the second coating agents are identical.

15. A coated particle comprising an alkaline earth metal carbonate core coated with:
    a first coating agent selected from the group consisting of alkylsulfates, carboxylic acids, their salts, and mixtures thereof, and
    a second coating agent selected from the group consisting of alkylsulfates, carboxylic acids, their salts, and mixtures thereof,
    wherein said coated particle exhibits a resistance to acids expressed as a Differential Scanning calorimetry (DSC) spectrum which shows at least one peak between 170 and 190° C. when measured at a heating rate of 10° C./min under nitrogen atmosphere from 25 to 250° C. in open cells.

16. The particle according to claim 15, obtained by carrying out coating of the alkaline earth metal carbonate core in at least two distinct consecutive steps.

17. The particle according to claim 16, wherein said core is first coated with said first coating agent and, consecutively thereafter, said second coating agent.

18. The particle according to claim 17, wherein the first and the second coating agents are different.

19. The particle according to claim 17, wherein the first and the second coating agents are identical.

20. A process for the preparation of the particle according to claim 1 comprising
  (a) contacting the alkaline earth metal carbonate core with said first coating agent in a first coating medium;
  (b) removing at least one fraction of said first coating medium said fraction being different from the coated particle of the alkaline earth metal carbonate resulting from (a); and
  (c) contacting the remaining fraction of the first coating medium obtained from (b) with said second coating agent in a second coating medium.

21. The process according to claim 20 wherein the water content of the first coating medium is higher than the water content of the second coating medium and further comprising a drying step between (b) and (c).

* * * * *